United States Patent
Zang et al.

(10) Patent No.: US 11,526,792 B2
(45) Date of Patent: Dec. 13, 2022

(54) SYSTEM AND METHOD FOR PREDICTING OUTPUTS ASSOCIATED WITH A FUTURE TIME SERIES

(71) Applicants: AT&T Intellectual Property I, L.P., Atlanta, GA (US); AT&T Mobility II LLC, Atlanta, GA (US)

(72) Inventors: Chuanyun Zang, Cumming, GA (US); Sheldon Kent Meredith, Roswell, GA (US); Zachary Meredith, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 697 days.

(21) Appl. No.: 16/414,833

(22) Filed: May 17, 2019

(65) Prior Publication Data
US 2020/0364596 A1 Nov. 19, 2020

(51) Int. Cl.
| | | |
|---|---|---|
| *G06N 7/08* | (2006.01) | |
| *G06K 9/62* | (2022.01) | |
| *G06N 20/00* | (2019.01) | |
| *G06N 3/08* | (2006.01) | |

(52) U.S. Cl.
CPC ............ *G06N 7/08* (2013.01); *G06K 9/6256* (2013.01); *G06N 3/08* (2013.01); *G06N 20/00* (2019.01)

(58) Field of Classification Search
None
See application file for complete search history.

(56) References Cited

PUBLICATIONS

De Gooijer JG, Hyndman RJ. 25 years of time series forecasting. International journal of forecasting. Jan. 1, 2006;22(3):443-73. (Year: 2006).*
Ellner S, Turchin P. Chaos in a noisy world: new methods and evidence from time-series analysis. The American Naturalist. Mar. 1, 1995;145(3):343-75. (Year: 1995).*
Wallis KF. Combining forecasts-forty years later. Applied Financial Economics. Jan. 1, 2011;21(1-2):33-41. (Year: 2011).*
Sagheer A, Kotb M. Time series forecasting of petroleum production using deep LSTM recurrent networks. Neurocomputing. Jan. 5, 2019;323:203-13. (Year: 2019).*
Lao W, Wang Y, Peng C, Ye C, Zhang Y. Time series forecasting via weighted combination of trend and seasonality respectively with linearly declining increments and multiple sine functions. In2014 International Joint Conference on Neural Networks (IJCNN) Jul. 6, 2014 (pp. 832-837). IEEE. (Year: 2014).*

(Continued)

*Primary Examiner* — Vincent Gonzales
(74) *Attorney, Agent, or Firm* — Guntin & Gust, PLC; Douglas Schnabel

(57) ABSTRACT

Aspects of the subject disclosure may include, for example, obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs. Other embodiments are disclosed.

20 Claims, 9 Drawing Sheets

(56) References Cited

PUBLICATIONS

Zang, "Deep Learning in Multiple Multistep Time Series Prediction", Machine Learning (stat.ML), Mar. 1, 2019, 2 pages.
Zang, Chuanyun, "Deep Learning in Large-Scaled Time Series Forecasting", Jul. 11, 2018, 3 pages.
Zang, Chuanyun, "Deep Learning in Multiple Multistep Time Series Prediction", Oct. 12, 2017, 14 pages.

* cited by examiner

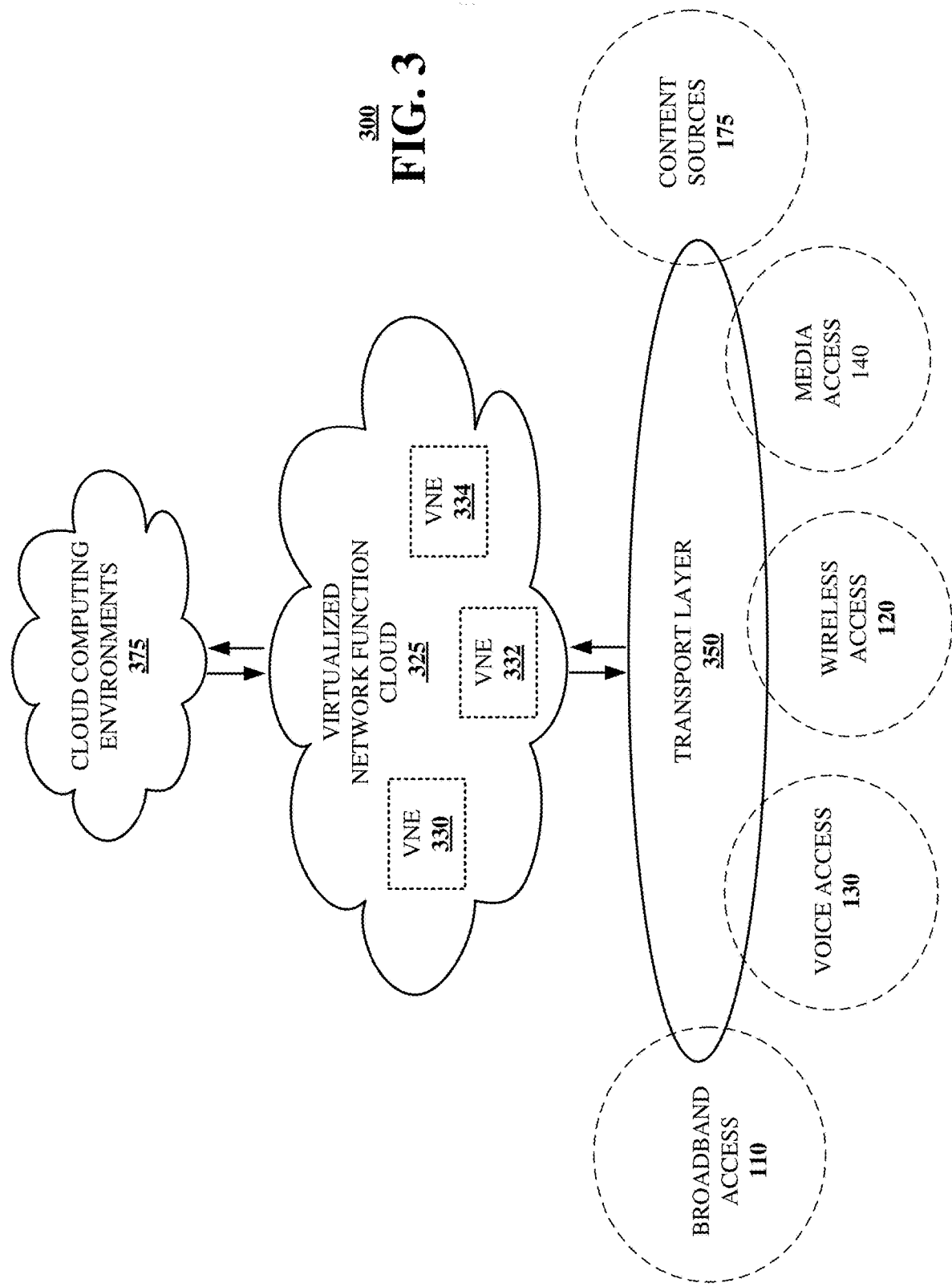

SYSTEM AND METHOD FOR PREDICTING OUTPUTS ASSOCIATED WITH A FUTURE TIME SERIES

FIELD OF THE DISCLOSURE

The subject disclosure relates to a system and method for predicting outputs associated with a future time series.

BACKGROUND

As the world continues to become increasingly connected over vast/various communication systems and networks, the amount of data/information that is generated and available in such systems/networks continues to increase. In many applications, it is desirable to predict an evolution in the data/information over time in order to determine/identify an output in relation to the data/information. To demonstrate, in connection with a management of a business, input data may be analyzed to determine an allocation of scarce resources over a given, future time frame.

Related categories of data are often grouped together as a time series to facilitate an analysis of the data. When the number of times series is small (e.g., is less than a first threshold), separate models for each of the time series may be generated and tuned with parameters that are unique to a given model. However, when the number of times series is large (e.g., is greater than a second threshold), it can become impractical to tune/customize each model. Still further, if a subset of the data/information is subject to biases or future events/conditions that have yet to occur, this represents another complexity in the modeling that needs to be accounted for in order to obtain accuracy in terms of prediction.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for generating predicted outputs based on historical observations and prospective events or conditions. Other embodiments are described in the subject disclosure.

One or more aspects of the subject disclosure include obtaining a plurality of datasets, generating a plurality of input time series responsive to the obtaining of the plurality of datasets, obtaining a plurality of historical output time series, applying an algorithm to the plurality of input time series and the plurality of historical output time series to generate a plurality of predicted time series, applying a plurality of weightings to the plurality of predicted time series to generate a plurality of weighted time series, and applying a simulation to the plurality of weighted time series to generate at least one predicted output.

One or more aspects of the subject disclosure include obtaining a plurality of datasets from a plurality of sources, generating a plurality of predicted time series responsive to the obtaining of the plurality of datasets, applying a plurality of weightings to the predicted time series to generate a plurality of weighted time series, applying a simulation to the plurality of weighted time series to generate a plurality of predicted outputs, wherein the applying of the simulation comprises applying a perturbation to the plurality of weighted time series to generate a respective range of confidence values associated with each of the plurality of predicted outputs, and presenting the plurality of predicted outputs and the respective range of confidence values associated with each of the plurality of predicted outputs on an output device.

One or more aspects of the subject disclosure include obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs.

Figure 1:
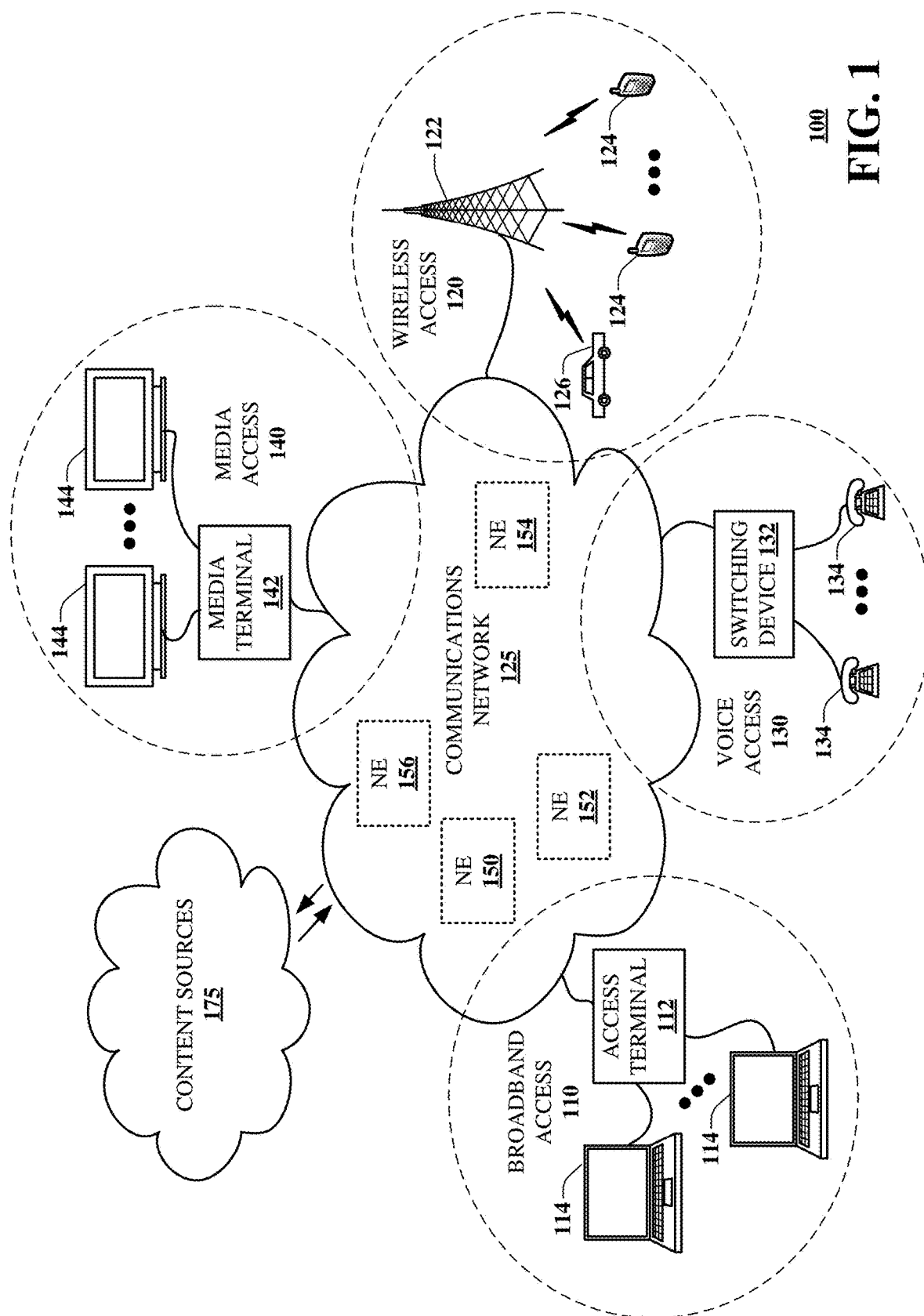
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part obtaining a plurality of datasets, generating a plurality of input time series responsive to the obtaining of the plurality of datasets, obtaining a plurality of historical output time series, applying an algorithm to the plurality of input time series and the plurality of historical output time series to generate a plurality of predicted time series, applying a plurality of weightings to the plurality of predicted time series to generate a plurality of weighted time series, and applying a simulation to the plurality of weighted time series to generate at least one predicted output. Communications network 100 can facilitate in whole or in part obtaining a plurality of datasets from a plurality of sources, generating a plurality of predicted time series responsive to the obtaining of the plurality of datasets, applying a plurality of weightings to the predicted time series to generate a plurality of weighted time series, applying a simulation to the plurality of weighted time series to generate a plurality of predicted outputs, wherein the applying of the simulation comprises applying a perturbation to the plurality of weighted time series to generate a respective range of confidence values associated with each of the plurality of predicted outputs, and presenting the plurality of predicted outputs and the respective range of confidence values associated with each of the plurality of predicted outputs on an output device. Communications network 100 can facilitate in whole or in part obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
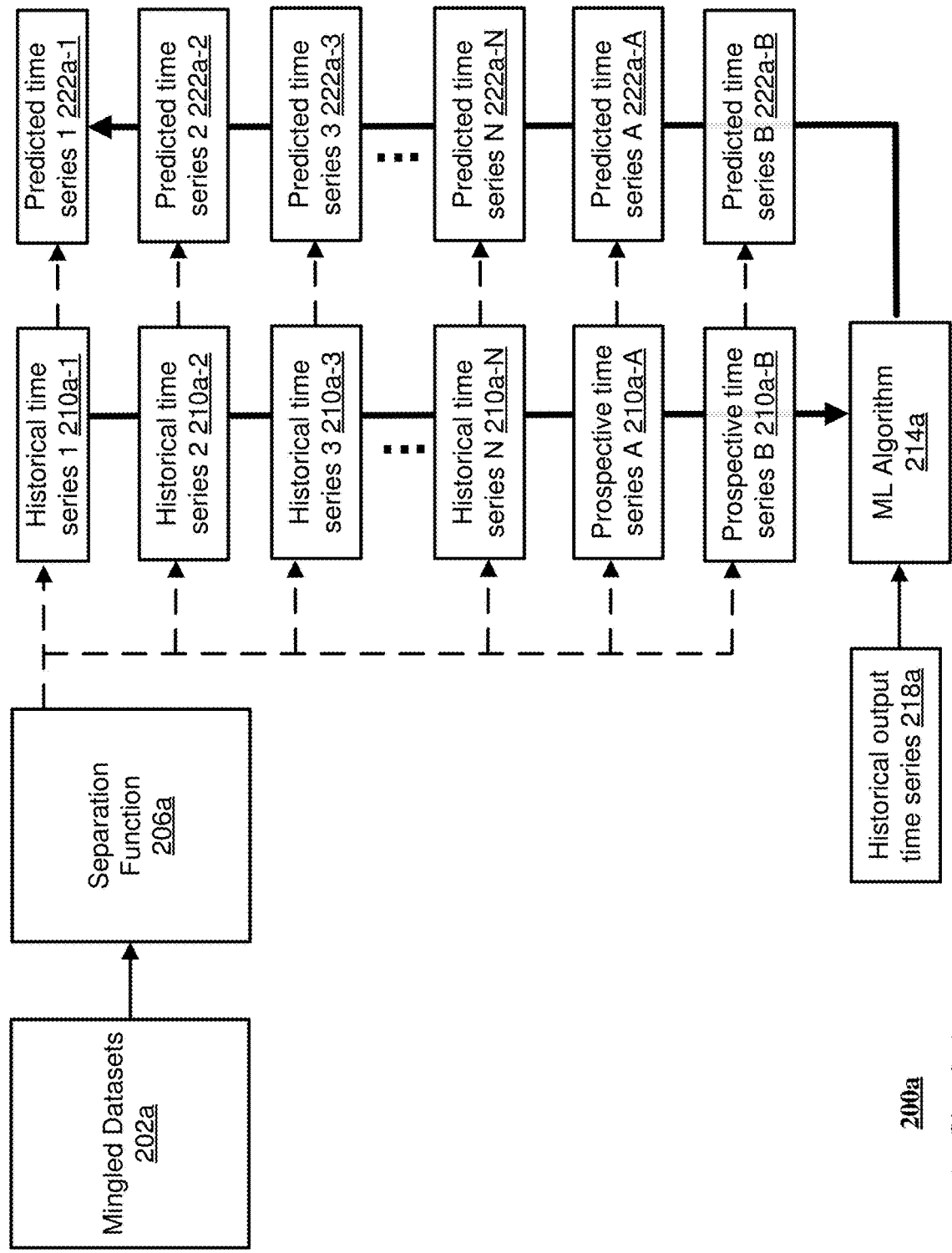
FIGS. 2A-2B illustrate an example, non-limiting embodiment of a system functioning within the communication network of FIG. 1 in accordance with various aspects described herein.
Figure 2B:
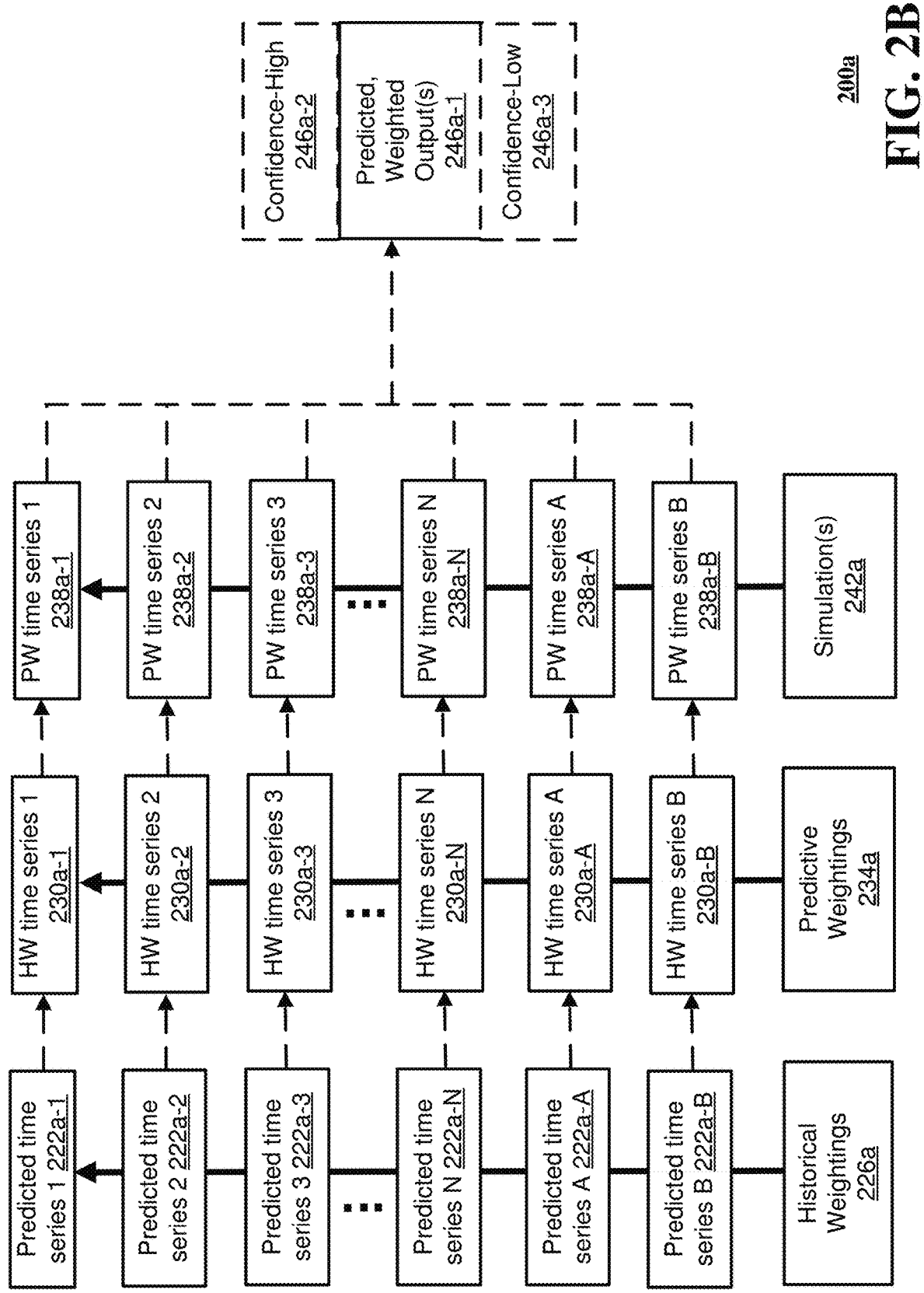

FIGS. 2A-2B, taken collectively, is a block diagram illustrating an example, non-limiting embodiment of a system 200a functioning within, or overlaid upon, the communication network of FIG. 1 in accordance with various aspects described herein. The system 200a may be used to predict values associated with a time series, where the time series may include one or more data points or information elements. As described below, a range of confidence values associated with the predicted values may be generated/established. In some embodiments, a sensitivity of the predicted values to noise or other perturbation may be determined/identified.

The system 200a may include, or obtain/receive, a collection of mingled datasets 202a. As the nomenclature implies, the datasets 202a may correspond to raw/unprocessed data. The data elements that compose the mingled datasets 202a may be obtained/received from a variety of different sources. For example, the data elements that are included in the mingled datasets 202a may be obtained from one or more (other) systems or devices. The data elements included in the mingled datasets 202a may be obtained from/via one or more networks.

Figure 2C:
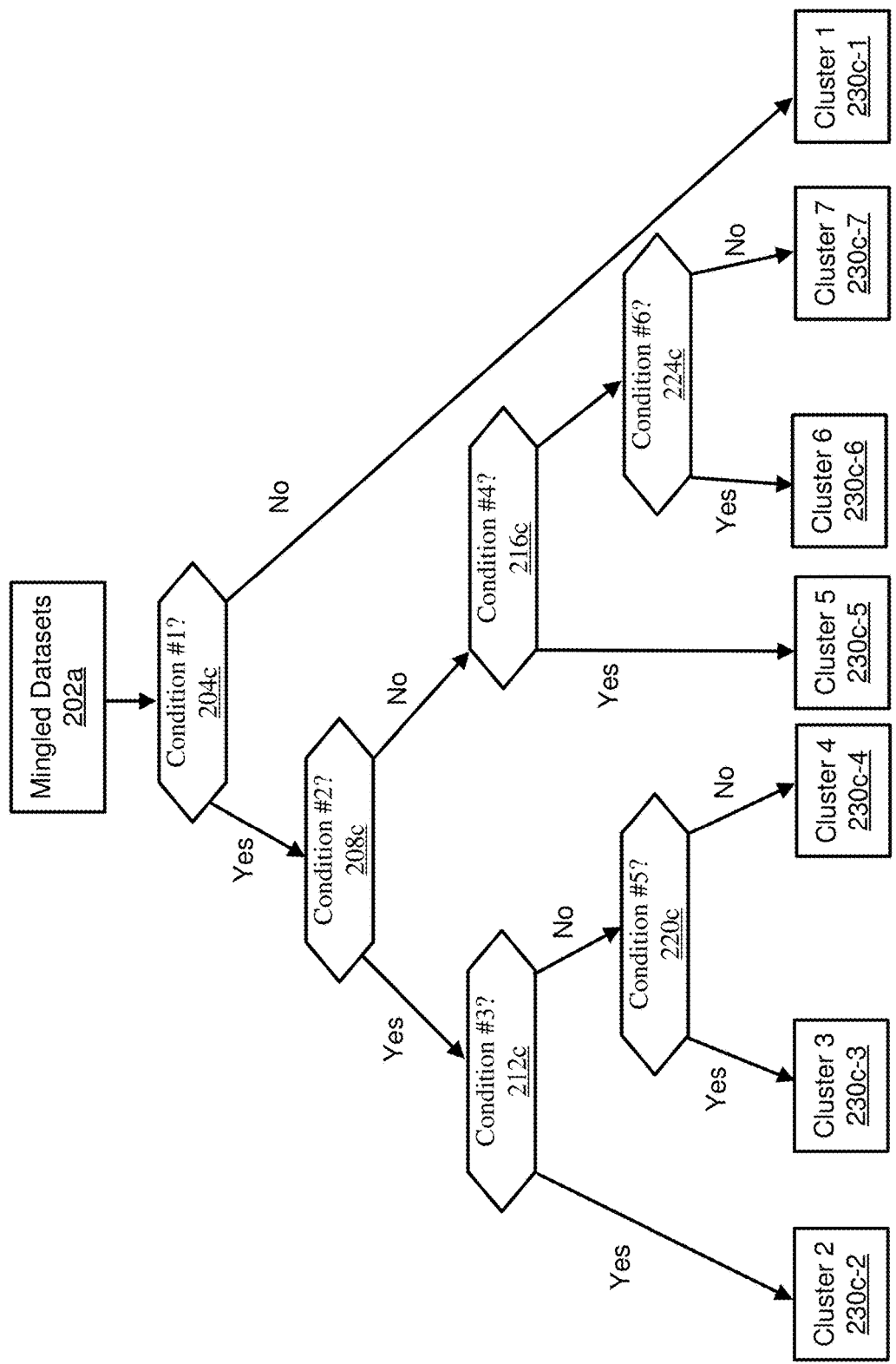
FIG. 2C illustrates an application of conditional tests to datasets to generate clusters in accordance with various aspects described herein.

A separation function 206a may be applied to the mingled datasets 202a in order to separate the mingled datasets 202a into 'N' sets of historical time series (e.g., historical time series 1 210a-1, historical time series 2 210a-2, historical time series 3 210a-3, . . . historical time series N 210a-N), where 'N' is a number. Briefly referring to FIG. 2C, an illustrative example of an application of the separation function 206a to the mingled datasets 202a to generate the historical time series is shown. In particular, the separation function 206a may apply one or more conditions/conditional tests (illustratively, condition #1 204c, condition #2 208c, condition #3 212c, condition #4 216c, condition #5 220c, and condition #6 224c) to the mingled datasets 202a to generate one or more leaves/clusters (illustratively, cluster 1 230c-1, cluster 2 230c-2, cluster 3 230c-3, cluster 4 230c-4, cluster 5 230c-5, cluster 6 230c-6, and cluster 7 230c-7). The particular numbers/counts of conditions/conditional tests and clusters shown in FIG. 2C is illustrative; the counts of conditions/conditional tests and/or clusters used in a given embodiment may be dependent on the application/environment that is at hand.

Each conditional test 204c through 224c may serve to check whether the data elements of the datasets 202a satisfy/include a particular attribute/parameter. If so, the "yes" path is taken out of that conditional test with respect to a given dataset 202a; otherwise, the "no" path is taken out of that conditional test with respect to the given dataset 202a. The resulting clusters 230c-1 through 230c-7 each contain one or more datasets that may be described by the attributes/parameters that were the subject of the chain/sequence of conditional tests that were applied to arrive at/obtain the respective cluster.

In some embodiments, a long-short-term-memory (LSTM) architecture or algorithm may be applied to one or more of the clusters 230c-1 through 230c-7 to encode patterns of variation in the sequences of the time series. The LSTM architecture/algorithm (or another LSTM architecture/algorithm) may be utilized to decode learned trends. Based on the applied LSTM architecture(s)/algorithm(s), different types of data/information may be mined, separately and deeply, as the sequences of time series in each cluster may share a high correlation. The deep learning aspects of LSTM may facilitate memorization of both short and long term dependencies within the sequences. Aspects of the LSTM architecture(s)/algorithm(s) may utilize various techniques to treat/analyze different types/formats of information/data, where categorical attributes/parameters may be used/applied as part of a decision-tree. Descriptive statistics may be used/applied to the time series of the clusters to filter information/data, and time series sequences may be studied/examined/analyzed by deep learning to identify patterns. In some embodiments, domain knowledge may be introduced and utilized to generate predictions/estimates of future values as described in further detail below. The organization/identification of the datasets 202a as part of the clusters may facilitate processing of the datasets in conjunction with a distributed/parallel processing architecture. If example, a given processor may be allocated the responsibility for processing a given cluster. Specialization/customization in terms of logic applied to the processing may be maintained/implemented by a given processor on the basis of the parameters/attributes that are unique to the respective cluster, thereby reducing the overall computational complexity and providing focus to similar/common types of data structures.

Referring back to FIG. 2A, in addition to the historical time series 210a-1 through 210a-N, one or more theoretical/prospective time series (e.g., prospective time series A 210a-A, prospective time series B 210a-B, etc.) may be included in the system 200a. Each of the theoretical/prospective time series may be auto-generated and/or may be based at least in part on a user-generated input. A theoretical/prospective time series may be introduced to the system 200a to assess how (on a qualitative basis and/or a quantitative basis) the prospective time series influences output(s) generated by the system 200a. The output(s) of the system 200a are described in further detail below.

An algorithm 214 may be applied to the historical time series 210a-1 through 210a-N, and any prospective time series (e.g., prospective time series 210a-A through 210a-B). In some embodiments, the algorithm 214a may include a machine learning (ML) algorithm. In some embodiments, the algorithm 214a may include a piecewise linear regression, deep learning algorithm.

The historical time series 210a-1 through 210a-N and the prospective time series 210a-A through 210a-B may correspond to sequences/sets of input conditions that existed when historical output time series 218a was/were generated. The algorithm 214a may: (1) remove any cross-correlations that may be present between the input historical time series 210a-1 through 210a-N and the prospective time series 210a-A through 210a-B (in any combination), and/or (2) determine a relative weighting/ranking of each of the input historical time series 210a-1 through 210a-N and the prospective time series 210a-A through 210a-B relative to the historical output time series 218a. On the basis of the application of the algorithm 214a, a set of predicted time series (e.g., predicted time series 1 222a-1, predicted time series 2 222a-2, predicted time series 3 222a-3, . . . predicted time series N 222a-N, predicted time series A 222a-A, predicted time series B 222a-B) may be generated. As shown in FIG. 2A, each of the predicted time series may be a counterpart to a historical or prospective time series.

Referring to FIGS. 2A-2B, historical weightings/weights 226a may be applied to each of the predicted time series (e.g., predicted time series 222a-1 through 222a-N; 222a-A; 222a-B) to generate a set of historically weighted (HW) time series (e.g., HW time series 1 230a-1, HW times series 2 230a-2, HW times series 3 230a-3, . . . HW times series N 230a-N, HW time series A 230a-A, HW times series B 230a-B). The historical weightings 226a may be selected in accordance with, and may be indicative of, the relevance of each of the respective time series in generating one or more outputs (e.g., one or more outputs included in the historical output time series 218a). Where applicable, adjustments may be made to the historical weights 226a to account for the introduction of one or more prospective time series (e.g., prospective time series A 210a-A, prospective time series B 210a-B, etc.). Collectively, the contribution made by each of the HW time series may sum to 100%.

Predictive weightings/weights 234a may be applied to the set of HW time series to generate a set of predictive weighted (PW) time series (e.g., PW time series 1 238a-1, PW time series 2 238a-2, PW time series 3 238a-3, . . . PW time series N 238a-N, PW time series A 238a-A, PW time series B 238a-B). The predictive weightings 234a may be selected in accordance with, and may be indicative of, the perceived relevance of each of the respective time series in generating one or more outputs on the basis of events/conditions that have not yet occurred but may occur in the future with some deterministic probability. Such futuristic events/conditions would not necessarily/normally be reflected in the historical time series; the predictive weightings 234a may be used to account for known/probabilistic future events/conditions.

One or more simulations 242a may be applied to the set of PW time series to generate one or more predicted, weighted outputs 246a-1. The simulations 242a may include a Monte Carlo simulation. In some embodiments, a perturbation (e.g., noise) may be injected/introduced as an input to the simulations 242a, wherein the perturbation may be representative of an uncertainty in one or more of the PW time series. The introduction of the perturbation to the simulations may establish a range of confidence in terms of the values of the outputs 246a-1, where the range is represented between the confidence on the high-end of the values (as represented by reference character 246a-2) and the confidence on the low-end of the values (as represented by reference character 246a-3). Still further, in some embodiments the perturbation may be applied iteratively/repeatedly while dithering on the value of the perturbation in order to provide an indication of how sensitive the outputs 246a-1 (or analogously, the confidence 246a-2 and/or 246a-3) are to the value of the perturbation.

Figure 2D:
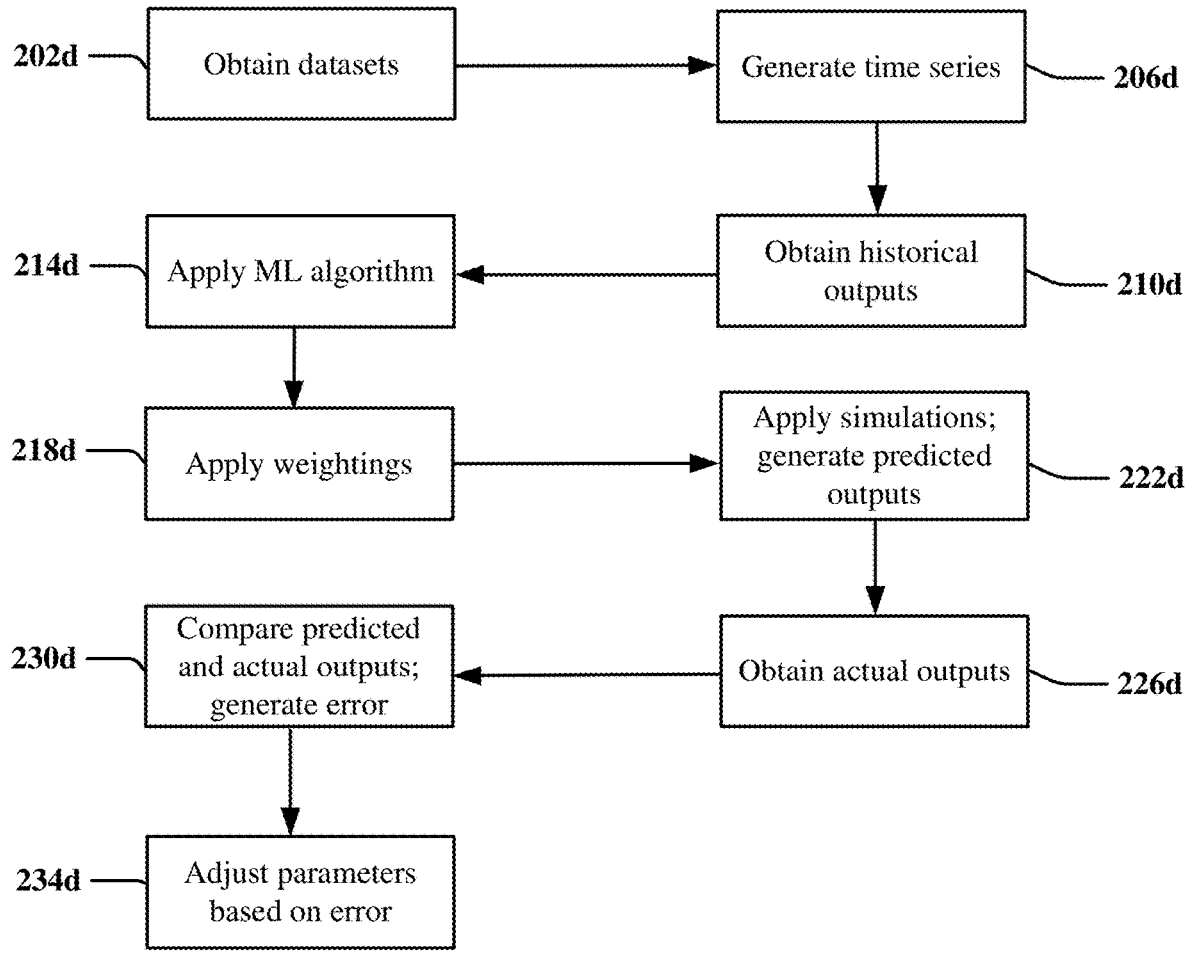
FIG. 2D depicts an illustrative embodiment of a method in accordance with various aspects described herein.

FIG. 2D depicts an illustrative embodiment of a method 200d in accordance with various aspects described herein. For the sake of illustrative convenience, the method 200d is described below in relation to the system 200a of FIGS. 2A-2B. Aspects of the method 200d may be implemented/practiced in connection with any number of systems, devices, or components.

In block 202d, one or more datasets (e.g., mingled datasets 202a) may be obtained. The datasets may be obtained from one or more sources, such as for example one or more networks, databases, servers, routers, gateways, user/client equipment/devices (e.g., mobile devices, set-top boxes, etc.). In some embodiments, access to the datasets may be conditioned on the successful receipt and verification/validation of one or more credentials. In this respect, one or more of the datasets may be protected in via of privacy/confidentiality considerations.

In block 206d, the datasets of block 202d may be separated such that one or more time series (e.g., historical time series 210a-1 through 210a-N, prospective time series A 210a-A, prospective time series B 210a-B) may be generated. Aspects of block 206d may incorporate a decision-tree of the type shown in FIG. 2C to generate one or more clusters to provide/facilitate ease in processing the time series.

In block 210d, one or more historical outputs (e.g., historical output time series 218a) may be obtained. For example, the historical outputs may be accessed from a database or other storage as part of block 210d.

In block 214d, an algorithm (e.g., the ML algorithm 214a) may be applied relative to the time series (of block 206d) and the historical outputs (of block 210d) to generate a set of predicted time series (e.g., predicted times series 222a-1 through 222a-N, 222a-A, 222a-B).

In block 218d, one or more weightings (or sets of weightings), such as for example the historical weightings 226a and/or the predictive weightings 234a, may be applied to the predicted time series of block 214d. Application of the weightings in block 218a may generate a set of weighted time series (e.g., PW time series 238a-1 through 238a-N, 238a-A, 238a-B).

In block 222d, one or more simulations (e.g., simulations 242a) may be applied to the set of weighted time series of block 218d, potentially on an iterative or repetitive basis. Application of the simulations in block 222d may generate one or more predicted, weighted outputs, a range of confidence in terms of the values of the outputs, and an indication of the sensitivity of the outputs to noise or other perturbation. One or more of these items may be presented on an output device (e.g., a speaker, a display device, a printed report, etc.).

In block 226d, one or more actual outputs may be obtained. For example, as part of block 226d, one or more values of the outputs may be obtained.

In block 230d, the (values of the) actual outputs of block 226d may be compared with the (values of the) predicted outputs of block 222d. Based on the comparison of block 230d, one or more error values may be generated, where the error values correspond to the difference between the actual outputs and the predicted outputs.

In block 234d, the error (of block 230d) may be used to adjust one or more parameters. For example, the error may be used to adjust the weightings (of block 218d), the simulations (of block 222d), etc., such that it is expected/anticipated that the error will converge to zero the more that the method 200d is executed.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of the disclosure may provide a model/framework/platform for predicting future outputs. The model/framework/platform may easily and readily scale to account for an arbitrary number of time series inputs, will account for a predicted trend of each input time series, will accommodate historical correlations between each time series and the outputs, will accommodate the historical weighting of each input time series while removing any cross-correlations between the inputs, and will provide an ability to accommodate deterministic/probabilistic future events/conditions.

Aspects of the disclosure may provide for confidence (or range of confidence values) in terms of values of predicted outputs. In some embodiments, such confidence may be modelled by jointly incorporating observed noise in input data, predicted inaccuracy in the future prediction of every time series, predicted noise in the computation of the weighting of the set of time series, and the statistical uncertainty of future "supposedly deterministic event" which have some degree of uncertainty in just how deterministic those event really are. To demonstrate, in modeling business units, two business units having the same size and growth predictions might initially receive equal investments from the parent company. However, if one of those growth predictions has a higher degree of confidence associated with it, then investment may be biased to the respective business unit with the higher degree of confidence associated with it.

As described above, aspects of the disclosure may provide an ability to "inject" theoretical/prospective time series datasets to understand the influence on the outputs and the confidence in those outputs. For instance, a first business may question the predicted future revenue of the first business if an acquisition of another/second business is completed. Analysis of this question may be accomplished by creating/generating prospective time series inputs where some reasonable assertions are made about the correlation of the business metrics (presented as time series inputs) and the outputs of the joint business. Due to the theoretical nature of the time series, it stands to reason such inputs would have higher degree of uncertainty, leading to more noise in the new/modified output prediction. Nonetheless, useful output information can be obtained, thereby improving business decisions beyond simple prediction.

Aspects of the disclosure may be applied to many different types of forecasting questions/applications. Forecasts/predictions may be generated in relation to an arbitrarily large set of input time series, some of which can be purely modeled. Various techniques may be applied to analyze the inputs, such as time series cross correlation, Fourier analysis, Fibonacci analysis, theoretical series injection, future bias handling, sensitivity analysis, and decision-trees to cluster the different time series (perhaps utilizing some domain knowledge), to provide/obtain superior predictive capabilities. Those skilled in the art will also recognize that such techniques can be used for prediction of substantially short-term outputs as to be considered operative in real-time. Real-time predictions may serve as a cornerstone for various technologies/applications, such as for example artificial intelligence, robotics, and real-time adaptation of meshes or complexes of automatons (e.g. robots) or pseudo-automatons (e.g. remote controlled vehicles requiring a degree of local, automatic decision processing). Aspects of the disclosure may be applied in connection with the foregoing technologies, as well as other technologies.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, and method 200d presented in FIGS. 1, 2A, 2B, and 2D. For example, virtualized communication network 300 can facilitate in whole or in part obtaining a plurality of datasets, generating a plurality of input time series responsive to the obtaining of the plurality of datasets, obtaining a plurality of historical output time series, applying an algorithm to the plurality of input time series and the plurality of historical output time series to generate a plurality of predicted time series, applying a plurality of weightings to the plurality of predicted time series to generate a plurality of weighted time series, and applying a simulation to the plurality of weighted time series to generate at least one predicted output. Virtualized communication network 300 can facilitate in whole or in part obtaining a plurality of datasets from a plurality of sources, generating a plurality of predicted time series responsive to the obtaining of the plurality of datasets, applying a plurality of weightings to the predicted time series to generate a plurality of weighted time series, applying a simulation to the plurality of weighted time series to generate a plurality of predicted outputs, wherein the applying of the simulation comprises applying a perturbation to the plurality of weighted time series to generate a respective range of confidence values associated with each of the plurality of predicted outputs, and presenting the plurality of predicted outputs and the respective range of confidence values associated with each of the plurality of predicted outputs on an output device. Virtualized communication network 300 can facilitate in whole or in part obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
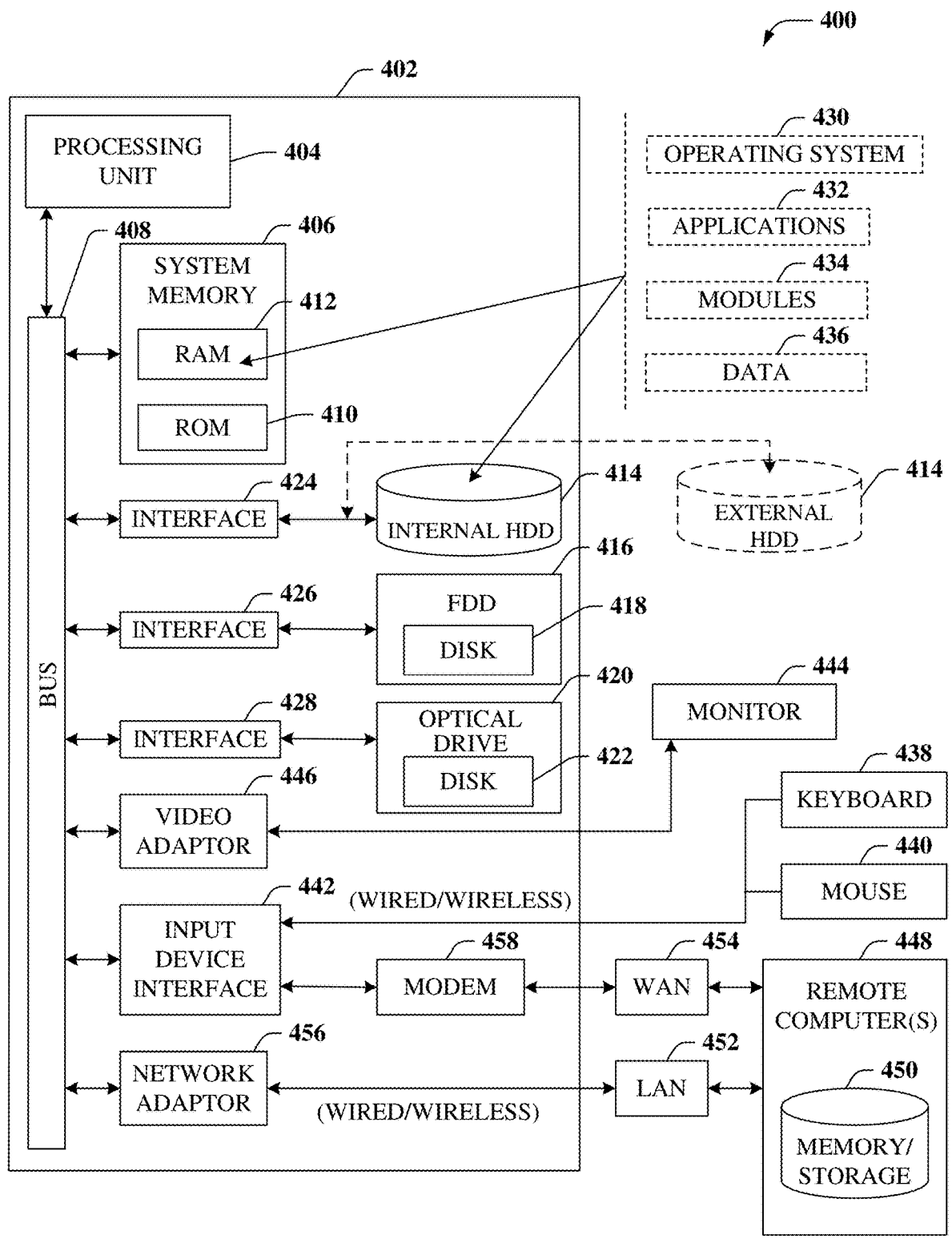
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a plurality of datasets, generating a plurality of input time series responsive to the obtaining of the plurality of datasets, obtaining a plurality of historical output time series, applying an algorithm to the plurality of input time series and the plurality of historical output time series to generate a plurality of predicted time series, applying a plurality of weightings to the plurality of predicted time series to generate a plurality of weighted time series, and applying a simulation to the plurality of weighted time series to generate at least one predicted output. Computing environment 400 can facilitate in whole or in part obtaining a plurality of datasets from a plurality of sources, generating a plurality of predicted time series responsive to the obtaining of the plurality of datasets, applying a plurality of weightings to the predicted time series to generate a plurality of weighted time series, applying a simulation to the plurality of weighted time series to generate a plurality of predicted outputs, wherein the applying of the simulation comprises applying a perturbation to the plurality of weighted time series to generate a respective range of confidence values associated with each of the plurality of predicted outputs, and presenting the plurality of predicted outputs and the respective range of confidence values associated with each of the plurality of predicted outputs on an output device. Computing environment 400 can facilitate in whole or in part obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
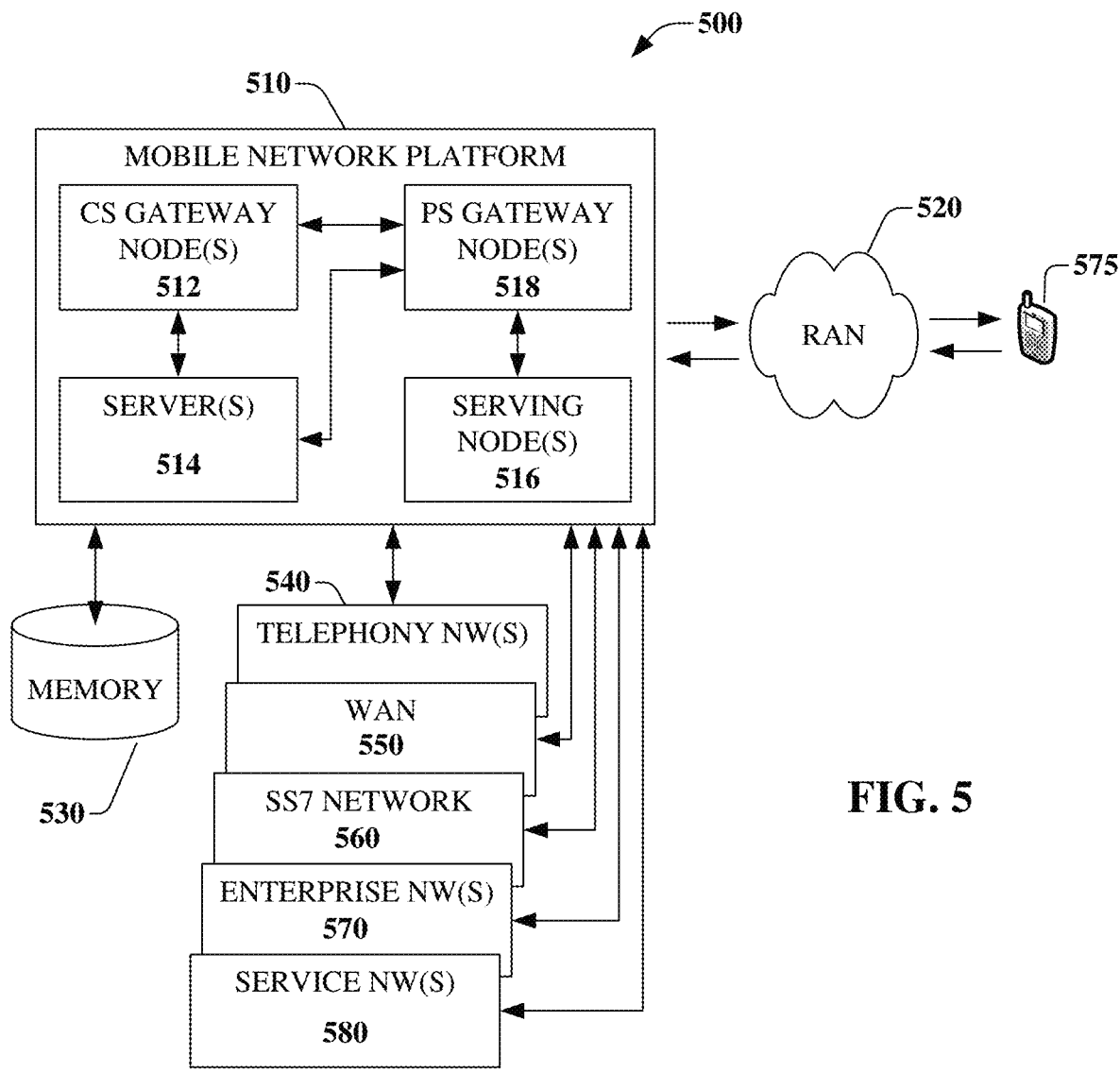
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a plurality of datasets, generating a plurality of input time series responsive to the obtaining of the plurality of datasets, obtaining a plurality of historical output time series, applying an algorithm to the plurality of input time series and the plurality of historical output time series to generate a plurality of predicted time series, applying a plurality of weightings to the plurality of predicted time series to generate a plurality of weighted time series, and applying a simulation to the plurality of weighted time series to generate at least one predicted output. Platform 510 can facilitate in whole or in part obtaining a plurality of datasets from a plurality of sources, generating a plurality of predicted time series responsive to the obtaining of the plurality of datasets, applying a plurality of weightings to the predicted time series to generate a plurality of weighted time series, applying a simulation to the plurality of weighted time series to generate a plurality of predicted outputs, wherein the applying of the simulation comprises applying a perturbation to the plurality of weighted time series to generate a respective range of confidence values associated with each of the plurality of predicted outputs, and presenting the plurality of predicted outputs and the respective range of confidence values associated with each of the plurality of predicted outputs on an output device. Platform 510 can facilitate in whole or in part obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
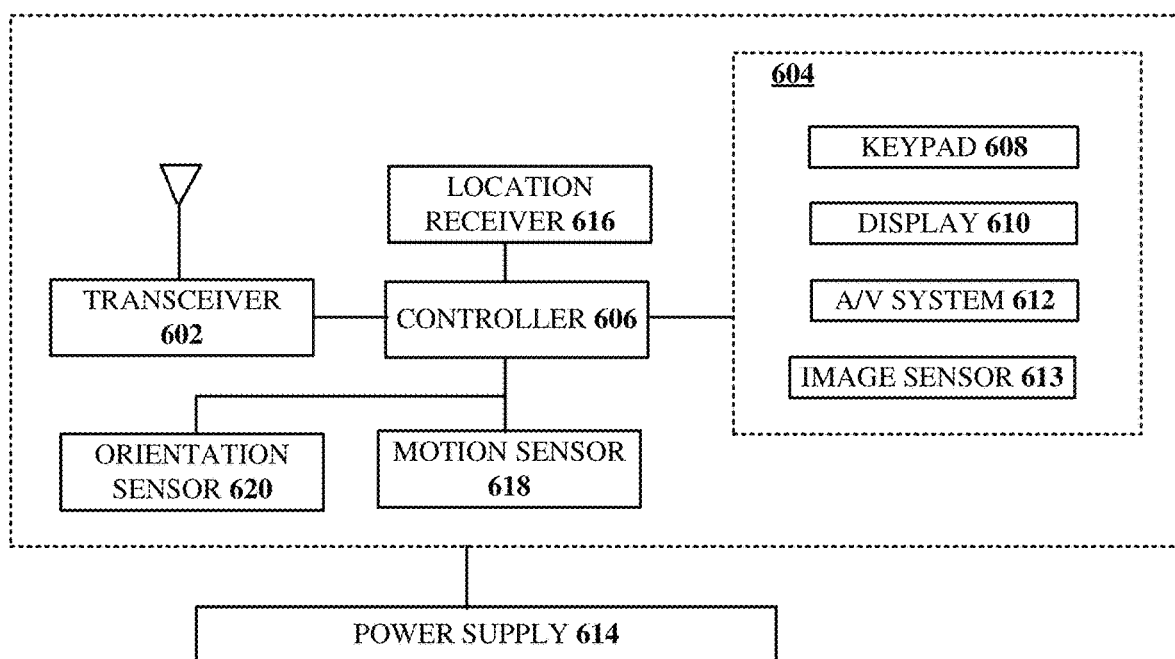
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a plurality of datasets, generating a plurality of input time series responsive to the obtaining of the plurality of datasets, obtaining a plurality of historical output time series, applying an algorithm to the plurality of input time series and the plurality of historical output time series to generate a plurality of predicted time series, applying a plurality of weightings to the plurality of predicted time series to generate a plurality of weighted time series, and applying a simulation to the plurality of weighted time series to generate at least one predicted output. Computing device 600 can facilitate in whole or in part obtaining a plurality of datasets from a plurality of sources, generating a plurality of predicted time series responsive to the obtaining of the plurality of datasets, applying a plurality of weightings to the predicted time series to generate a plurality of weighted time series, applying a simulation to the plurality of weighted time series to generate a plurality of predicted outputs, wherein the applying of the simulation comprises applying a perturbation to the plurality of weighted time series to generate a respective range of confidence values associated with each of the plurality of predicted outputs, and presenting the plurality of predicted outputs and the respective range of confidence values associated with each of the plurality of predicted outputs on an output device. Computing device 600 can facilitate in whole or in part obtaining a plurality of historical inputs, obtaining a plurality of historical outputs, applying a piecewise linear regression, deep learning algorithm to at least the plurality of historical inputs and the plurality of historical outputs to generate a plurality of predicted inputs, applying a plurality of weightings to the plurality of predicted inputs to generate a plurality of predicted weighted inputs, and applying at least one simulation to the plurality of predicted weighted inputs to generate a plurality of predicted weighted outputs.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and
a memory that stores executable instructions that, when executed by the processing system, facilitate performance of operations, the operations comprising:
receiving credentials associated with a user;
verifying the credentials associated with the user;
responsive to verifying the credentials associated with the user, obtaining a plurality of datasets;
generating a plurality of input time series responsive to the obtaining the plurality of datasets;
obtaining a plurality of historical output time series;
applying an algorithm to the plurality of input time series and the plurality of historical output time series to generate a plurality of predicted time series;
applying a plurality of weightings to the plurality of predicted time series to generate a plurality of weighted time series, wherein the plurality of weightings comprises a plurality of historical weightings and a plurality of predictive weightings;
applying a simulation to the plurality of weighted time series to generate at least one predicted output via applying a perturbation that is representative of an uncertainty in the plurality of weighted time series, wherein the perturbation is applied on an iterative basis while dithering on a value of the perturbation to obtain an indication of a sensitivity of the at least one predicted output to the perturbation; and
presenting the indication of the sensitivity of the at least one predicted output to the perturbation as a first audio signal carried by a speaker device.

2. The device of claim 1, wherein the receiving the credentials associated with the user further comprises receiving a second audio signal via a microphone device; and wherein the verifying the credentials associated with the user further comprises performing a voice recognition process on the second audio signal.

3. The device of claim 1, wherein the plurality of input time series comprises a plurality of historical input time series that is based on the plurality of datasets, and wherein the plurality of input time series comprises at least one prospective input time series.

4. The device of claim 1, wherein the operations further comprise:
obtaining an actual output;
comparing the at least one predicted output to the actual output; and
generating an error responsive to the comparing.

5. The device of claim 4, wherein the operations further comprise:
adjusting at least one parameter responsive to the generating of the error, wherein the at least one parameter is associated with the simulation, the plurality of weightings, or a combination thereof.

6. The device of claim 1, wherein the simulation comprises a Monte Carlo simulation.

7. The device of claim 1, wherein the applying of the simulation to the plurality of weighted time series further generates a range of confidence values associated with the at least one predicted output.

8. The device of claim 7, wherein the operations further comprise presenting the range of confidence values associated with the at least one predicted output on an output device.

9. The device of claim 1, wherein the generating of the plurality of input time series comprises applying a plurality of conditional tests to the plurality of datasets to generate a plurality of clusters, and wherein each cluster of the plurality of clusters comprises a subset of the plurality of datasets.

10. The device of claim 9, wherein each dataset included in each subset comprises a plurality of common parameters relative to other datasets of the subset.

11. A machine-readable medium, comprising executable instructions that, when executed by a processing system including a processor, facilitate performance of operations, the operations comprising:
receiving credentials associated with a user;
verifying the credentials associated with the user;
responsive to verifying the credentials associated with the user, obtaining a plurality of datasets from a plurality of sources;
generating a plurality of predicted time series responsive to the obtaining of the plurality of datasets;
applying a plurality of weightings to the predicted time series to generate a plurality of weighted time series, wherein the plurality of weightings comprises a plurality of historical weightings and a plurality of predictive weightings;
applying a simulation to the plurality of weighted time series to generate a plurality of predicted outputs; via applying a perturbation that is representative of an uncertainty in the plurality of weighted time series, wherein the perturbation is applied on an iterative basis while dithering on a value of the perturbation to obtain an indication of a sensitivity of at least one predicted output to the perturbation; and
presenting the plurality of predicted outputs and the indication of the sensitivity of the at least one predicted output to the perturbation as a first audio signal carried by a speaker device.

12. The machine-readable medium of claim 11, wherein the plurality of sources comprises a network, a database, a server, a router, a gateway, a user equipment, or any combination thereof.

13. The machine-readable medium of claim 11, wherein the operations further comprise:
applying a separation function to the plurality of datasets to generate a first plurality of time series,
wherein the generating of the plurality of predicted time series is based on the first plurality of time series.

14. The machine-readable medium of claim 13, wherein the operations further comprise:
receiving a second plurality of time series,
wherein the generating of the plurality of predicted time series is further based on the second plurality of time series.

15. The machine-readable medium of claim 14, wherein the first plurality of time series comprises a plurality of historical input time series, wherein the second plurality of time series comprises a plurality of prospective time series, and wherein the operations further comprise:
obtaining a third plurality of time series, wherein the third plurality of time series comprises a plurality of historical output time series.

16. The machine-readable medium of claim 11, wherein the receiving the credentials associated with the user further comprises receiving a second audio signal via a microphone device; and wherein the verifying the credentials associated with the user further comprises performing a voice recognition process on the second audio signal.

17. A method, comprising:
receiving, by a processing system including a processor, credentials associated with a user;
verifying, by the processing system, the credentials associated with the user;
responsive to verifying the credentials associated with the user, obtaining, by a processing system including a processor, a plurality of historical inputs;
obtaining, by the processing system, a plurality of historical outputs;
applying, by the processing system, a machine learning algorithm to at least the plurality of historical inputs and the plurality of historical outputs to generate a plurality of predicted inputs;
applying, by the processing system, a plurality of weightings to the plurality of predicted inputs to generate a plurality of predicted weighted inputs, wherein the plurality of weightings comprises a plurality of historical weightings and a plurality of predictive weightings;
applying, by the processing system, at least one simulation to the plurality of predicted weighted inputs to generate a plurality of predicted weighted outputs via applying a perturbation that is representative of an uncertainty in a plurality of weighted time series, wherein the perturbation is applied on an iterative basis while dithering on a value of the perturbation to obtain an indication of a sensitivity of at least one predicted output to the perturbation; and
presenting, by the processing system, the indication of the sensitivity of the at least one predicted output to the perturbation as a first audio signal carried by a speaker device.

18. The method of claim 17, receiving, by the processing system, the credentials associated with the user further comprises receiving a second audio signal via a microphone device; and wherein the verifying the credentials associated with the user further comprises performing a voice recognition process on the second audio signal.

19. The method of claim 17, further comprising:
obtaining, by a processing system, a plurality of datasets;
organizing, by the processing system, the plurality of datasets into a plurality of clusters, wherein each of the clusters comprises a plurality of time series that share common parameters, and wherein each time series comprises a plurality of information elements; and
applying at least one long-short-term-memory (LSTM) algorithm to each cluster of the plurality of clusters to encode patterns of variation in sequences of the plurality of time series of the cluster and to decode learned trends,
wherein the obtaining of the plurality of historical inputs is responsive to the applying of the at least one long-short-term-memory (LSTM) algorithm.

20. The method of claim 17, wherein the applying of the at least one simulation to the plurality of predicted weighted inputs further generates a range of confidence values associated with at least one predicted weighted output of the plurality of predicted weighted outputs.

\* \* \* \* \*